United States Patent [19]

Shaper

[11] Patent Number: 4,988,584
[45] Date of Patent: Jan. 29, 1991

[54] LOCKABLE POWER MODULE AND METHOD, PARTICULARLY FOR ELECTRONIC FLASH UNITS

[75] Inventor: Richard Shaper, Old Brookville, N.Y.

[73] Assignee: Quantum Instruments, Inc., Garden City, N.Y.

[21] Appl. No.: 415,706

[22] Filed: Oct. 2, 1989

[51] Int. Cl.⁵ .......................................... H01M 2/00
[52] U.S. Cl. ...................................... 429/50; 429/97; 429/123
[58] Field of Search ................. 429/50, 9, 121–123, 429/96–100; 439/500; 307/150; 352/242

[56] References Cited

U.S. PATENT DOCUMENTS

| | | |
|---|---|---|
| 145,116 | 12/1873 | McKiernan . |
| 898,887 | 9/1908 | Heyman . |
| 3,999,110 | 12/1976 | Ramstrom et al. ............... 320/2 |
| 4,146,682 | 3/1979 | Nakao ............................ 429/97 |
| 4,206,274 | 6/1980 | Peels ............................. 429/99 |
| 4,457,117 | 7/1984 | Leiher et al. .................. 52/238.1 |
| 4,690,878 | 9/1987 | Nakamura ...................... 429/1 |
| 4,729,707 | 3/1988 | Takahashi ..................... 411/389 |
| 4,767,358 | 8/1988 | Nullmeyer et al. .............. 439/500 |
| 4,786,201 | 11/1988 | Huetter et al. ................. 403/22 |

*Primary Examiner*—Anthony Skapars
*Attorney, Agent, or Firm*—Jacobs & Jacobs

[57] ABSTRACT

A lockable power module is locked in position within a battery compartment of an electronic flash unit by manually displacing a pair of locking members on the module outwardly therefrom to tightly grip the compartment walls.

13 Claims, 2 Drawing Sheets

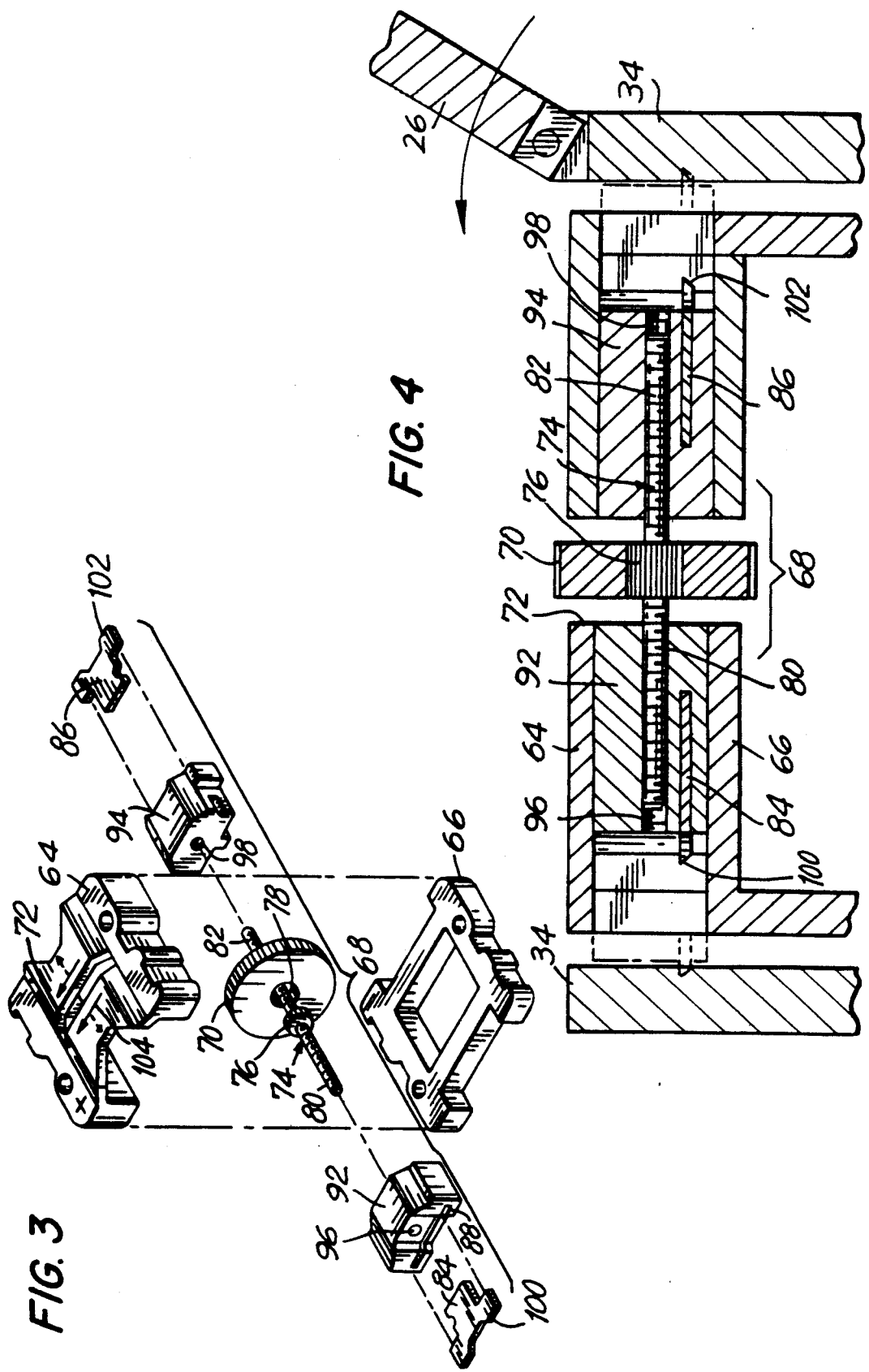

LOCKABLE POWER MODULE AND METHOD, PARTICULARLY FOR ELECTRONIC FLASH UNITS

BACKGROUND OF THE INVENTION

1. Field of the Invention

This invention generally relates to an arrangement for and a method of supplying electrical power from an external electrical power source to a battery-powered electrical device such as an electronic flash unit and, more particularly, to a lockable power module insertable into a battery compartment of the unit and reliably locked in position within the compartment.

2. Description of Related Art

Photographers using battery-powered electronic flash units as camera accessories often resort to portable external rechargeable battery packs to power the flash units. Such rechargeable battery packs typically provide better performance and deliver more electrical energy in a shorter time, as compared to individual dry cell batteries. Many photographers often do not want to be bothered with replacing individual batteries, and certainly commercial photographers do not want to be faced with a failing or depleted power source during a photographic session.

In order to supply electrical power from a rechargeable battery pack to a battery-powered flash unit, it is known to remove the individual batteries that normally power the flash unit from a battery compartment provided in the unit, and to insert a so-called power module into the compartment after the batteries have been removed. A twin-wire cable has one end connected to the module and an opposite end furnished with a connector. The connector is plugged into the rechargeable battery pack, thereby conducting electrical power from the pack to the flash unit when the power module is inserted into the compartment.

Although generally acceptable for its intended purpose of supplying power to the flash unit, the known power module has not proven to be altogether reliable in practice. The use of a cable and its associated external battery pack has resulted in an awkward, non-reliable connection of the power module in the battery compartment. The battery compartment of most flash units is typically closed by a door that is either hinged to, or slidable on, the flash unit. When either the hinged or sliding door is closed, the door serves the important function of pressing the anodes and cathodes of the individual batteries into affirmative engagement with electrical power terminals located on a bottom wall of the battery compartment, thereby insuring a reliable electrical connection.

However, when using the external battery pack, the presence of the cable has interfered with the aforementioned pressing function of the door because the door could not be fully closed without pinching or otherwise damaging the cable. Failure to fully or properly close the battery compartment door compromised the reliability of the electrical connection between the power module and the flash unit because, simply put, the partially open door no longer reliably held the power module in the compartment. Under certain circumstances, the power module could fall out of the battery compartment due to the improperly or incompletely closed door.

To avoid this unreliability problem, some photographers have cut a notch in the door to allow the cable to exit. The door could now be closed and also could provide at least some pressure against the power module. However, many photographers are reluctant to cut irreparable portions out of their flash units, not only because the trade-in value of so-damaged flash units is decreased, but also because of the degradation in appearance due to such unsightly notches.

Other photographers have simply made the best of a bad situation and partially closed the battery compartment door, leaving only enough room for the cable to exit. In this event, the door must be held ajar by some means, typically adhesive tape or hook-and-loop-type fasteners in order to position the door to apply pressure on the module and, in turn, on the electrical terminals within the battery compartment. However, this modification is an inelegant solution since the partially-open door is always prone to being fully open, depending on the reliability of the holding power of the adhesive or fasteners used. Also, a partially-open door is esthetically unattractive.

Since different flash units are formed with differently sized battery compartments, the manufacturers of power modules have had to design their modules with a compromise size suitable to fit within several battery compartments of different sizes. Needless to say, an undersized power module for an oversized battery compartment tends to undesirably shift within the same, bounce repeatedly against the partially-open door, and is more likely to fall out of the compartment.

SUMMARY OF THE INVENTION

1. Objects of the Invention

It is a general object of this invention to securely hold a power module in position within a battery compartment without using the battery compartment door to secure the module in place.

It is another object of this invention to eliminate the need to cut notches in battery compartment doors.

A further object of this invention is to reliably prevent the power module from falling out of a battery compartment during use.

Still another object of this invention is to promote the use of external, portable, rechargeable battery packs in conjunction with electronic flash units.

Yet another object of this invention is to provide a power module lockable within a battery compartment which is inexpensive in construction, easy to use, and portable.

2. Features of the Invention

In keeping with these objects, and others which will become apparent hereinafter, one feature of this invention resides, briefly stated, in an arrangement for, and a method of, supplying electrical power from an external electrical power source, e.g. a rechargeable battery pack, to a battery-powered electrical device, e.g. a flash unit. The electrical device advantageously has walls bounding a battery compartment from which the batteries have been removed, as well as electrical power terminals located within the compartment.

This invention comprises a power module having electrical contacts, and insertable into the compartment to a position of use in which the contacts engage the terminals. Conductor means are connected between the power source and the module, and are operative for conveying electrical power from the source to the device when the module is in the use position.

In accordance with this invention, locking means are provided on the module. The locking means are operative for lockingly engaging the compartment walls to lock the module within the compartment. Thus, by engaging the compartment walls to hold the module in place within the compartment, the need to use the battery compartment door, as taught by the prior art, to secure the module within the compartment, is eliminated.

The locking means, according to a preferred embodiment, include a pair of displaceable locking members located at opposite sides of the module, and actuator means for displacing the locking members toward each other inwardly of the module to a retracted position in which the module is unlocked relative to the compartment, and for selectively displacing the locking members away from each other outwardly of the module to an extended position in which the locking members tightly grip the compartment walls and lock the module within the compartment.

The actuator means include a manually-turnable wheel mounted on the module for turning movement in either circumferential direction about a turning axis, and a transmission operatively connected between the wheel and the locking members. The transmission includes a shaft having threaded ends of opposite pitch. The shaft is coupled to, and turnable by, the wheel. A pair of holders, one for holding each locking member, are threadedly engaged with a respective threaded shaft end and are mounted on the module for axial movement along the axis. Turning the wheel in one circumferential direction about the axis causes the locking members to be displaced to the retracted position. Turning the wheel in the opposite circumferential direction about the axis causes the locking members to be displaced to the extended position. Indicia means are advantageously provided on the module for visually indicating to a user the direction of turning the wheel to effect displacement of the locking members to the extended position. To insure an affirmative locking engagement between the locking members and the compartment walls, each locking member is provided with outer gripping edges for grippingly engaging, and at least partially biting, opposite walls in the compartment in the extended position.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is an exploded front perspective view of a locking mechanism used in the module of FIG. 2; and FIG. 4 is an enlarged sectional view taken on line 4—4 of FIG. 1.

DETAILED DESCRIPTION OF THE PREFERRED EMBODIMENT

Figure 1:
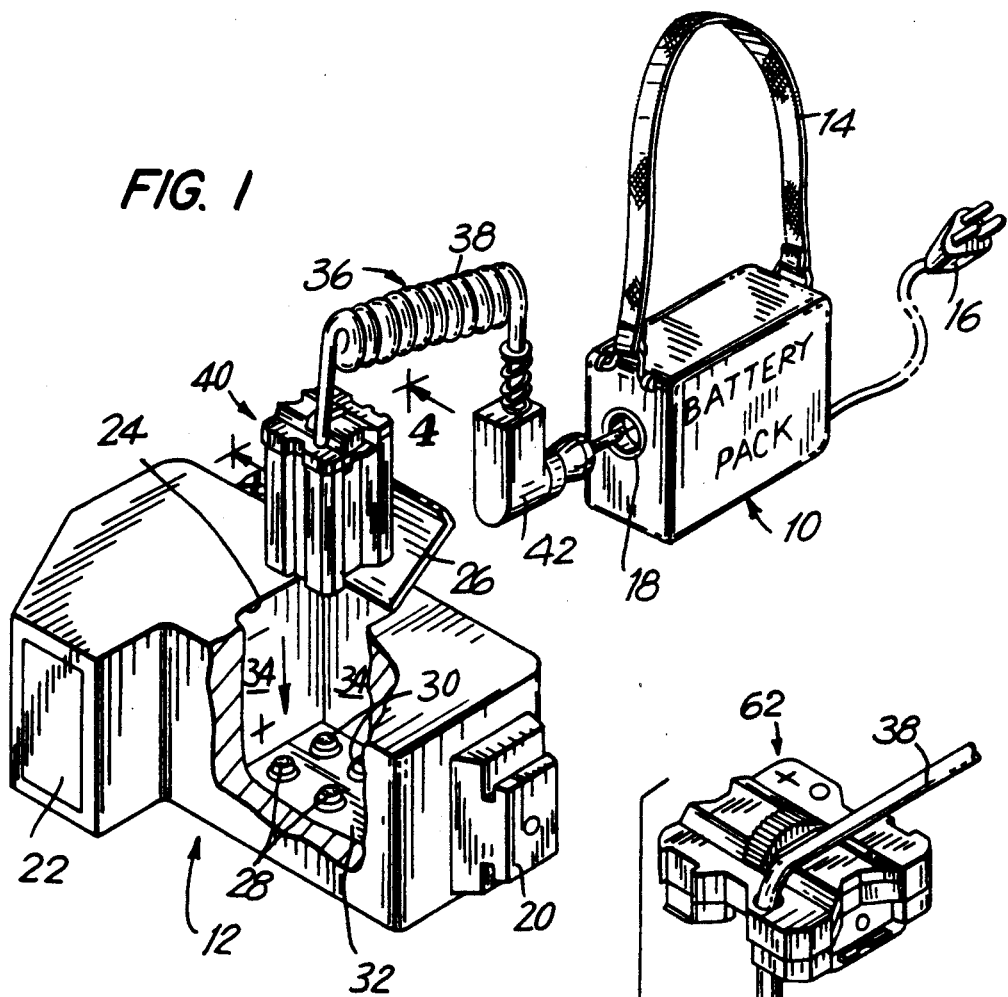
FIG. 1 is a partly broken-away front perspective view of an arrangement according to this invention.

Referring now to the drawings, reference numeral 10 in FIG. 1 generally identifies an external electrical power source such as a rechargeable battery pack. Reference numeral 12 generally identifies a battery-powered electrical device such as an electronic flash unit. Battery pack 10 and flash unit 12 are conventional pieces of equipment in the field of photography and, hence, are not believed to require any extended discussion, except to point out that, once fully charged, the battery pack 10 is portable and generally carried on one's person, typically by means of a shoulder strap 14. The pack 10 contains rechargeable cells, typically of the sealed lead-acid type which are electrically connected to, and charged by, a battery charger which ultimately derives its electrical energy from a wall outlet via an electrical plug 16. As described below, the pack 10 also includes an electrical power socket 18.

As for the flash unit 12, it has, among other things, a hot shoe mount 20 for mounting on a camera, a light source 22, and a battery compartment 24 normally covered and closed by a door 26. The flash unit is intended to operate by battery power alone, i.e. without the aid of the battery pack 10. For that purpose, a set of non-illustrated batteries, typically 4AA-type dry cells, are inserted into compartment 24. Electrical power positive and negative terminals 28, 30 are stationarily mounted within the compartment 24, typically on a bottom wall 32 thereof. Side walls 34 extend upwardly of the bottom wall 32 and together bound a generally rectangular compartment. When the door 26 is closed, typically by either pivoting a hinged door or by sliding shut a slidable door, the door 26 itself presses the batteries against the terminals 28, 30 into intimate electromechanical contact therewith, thereby insuring a reliable electrical connection.

As explained previously, when a user does not wish to rely on the performance of on-board batteries, but, instead, wishes to avail himself or herself of the better performance provided by an external alternate battery pack 10, an arrangement 36 is used, according to this invention, for supplying electrical power from the pack 10 to the flash unit 12. The arrangement 36 includes a lockable power module 40 electrically connected via a cable 38 to an electrical connector 42 which, in turn, is inserted into power socket 18.

Figure 2:
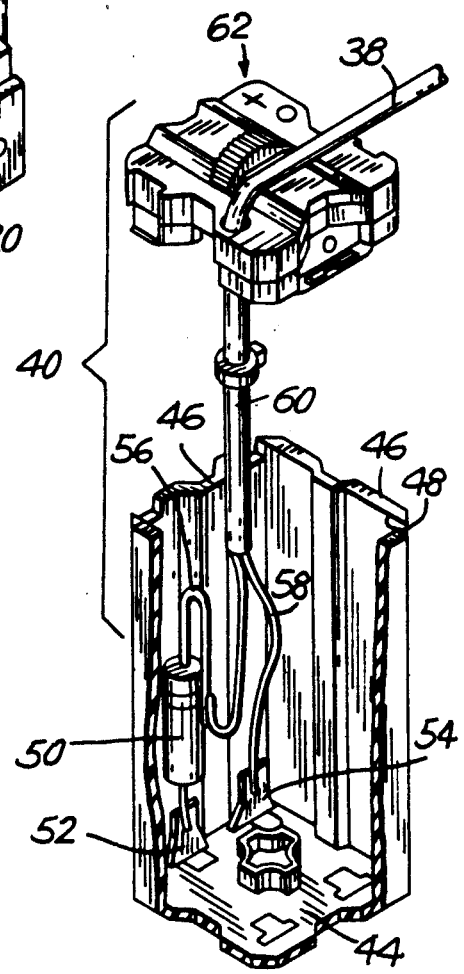
FIG. 2 is a partly broken-away front perspective view of a lockable module of the arrangement of FIG. 1.

As best shown in FIG. 2, the power module 40 includes a housing 42 having a closed base wall 44 and upstanding side walls 46 together bounding an interior 48 in which a diode 50, a positive electrical contact 52 and a negative electrical contact 54 are mounted. The contacts 52, 54 extend through and beyond the base wall 44. The cable 38 has two wires 56, 58 surrounded by a protective sheath 60. Wire 56 is connected to one end of the diode 50 whose opposite end is connected to the electrical contact 52. Wire 58 is directly connected to contact 54.

The housing 42 has an open top covered and closed by a cover 62. As best shown in FIG. 3, the cover 62 includes an upper casing 64, a lower casing 66 connected to the upper casing, and a locking mechanism 68 mounted between the casings 64, 66. The locking mechanism 68 includes a finger wheel 70 mounted on the cover 62 for turning movement in either circumferential direction about a turning axis. The periphery of the wheel 70 is ribbed, knurled or otherwise roughened to provide a better finger grip for the user. A part of the wheel 70 extends upwardly through a rectangular slot 72 formed in the upper casing 64 to provide manual access to the locking mechanism.

A drive shaft 74 extends along the turning axis through the center of the wheel 70. The shaft 74 has a central gear 76 fixedly mounted thereon. The gear 76 tightly engages interiorly within a circular hole 78 formed at the center of the wheel 70. The hole 78 can alternately be formed with mating gear teeth to provide for meshing engagement between the gear 76 and the wheel 70. The shaft 74 has two shaft end portions 80, 82, each of opposite pitch.

A pair of displaceable locking members 84, 86, preferably constituted as metallic plates, are friction-tightly mounted within slots 88, 90 formed in holders 92, 94. Each holder 92, 94 has an interiorly-threaded passage 96, 98. The pitches of passages 96, 98 match those of the threaded shaft end portions 80, 82 which are threadedly received in said passages.

The locking members are generally planar, and each has a pair of outer gripping teeth or edges 100, 102. When the locking members 84, 86 are inserted into the holders, the outer gripping edges 100, 102 extend slightly outwardly beyond the holders (see FIG. 4).

In use, after the door 26 has been opened and the batteries removed from the compartment 24, the power module 40 is inserted into the compartment until the electrical contacts 52, 54 on the module respectively engage the terminals 28, 30 within the compartment. As shown in FIG. 4, the insertion is only possible when the locking members 84, 86 are retracted and spaced away from the side walls 34 of the compartment.

Thereupon, by turning the wheel 70 in the direction indicated by the solid arrow indicator 104 (see FIG. 3), the shaft 74 is turned, thereby displacing the holders 92, 94 and the locking members 84, 86 supported thereon simultaneously in opposite directions apart from each other axially along the turning axis. The holders 92, 94 do not turn with the threaded end portions 80, 82 since the holders are constrained by the upper and lower casings 64, 66 so as to permit only axial movement. In other words, the upper and lower casings 64, 66 have interior wall portions which bound axially-extending channels along which the holders 92, 94 are constrainably displaced.

The turning of the wheel 70 and the simultaneous outward displacement of the locking members continues until the outer gripping edges 100, 102 lockingly engage the side walls 34 of the compartment. The outer gripping edges penetrate and bite into, at least to a limited extent, the side walls 34 in order to assure a reliable locking of the inserted module within the compartment.

The door 26 can be left open or closed. It no longer matters because the door no longer is employed, as taught by the prior art, to press the batteries or the power module in place within the compartment. Now, in accordance with this invention, the locking action performed by the locking members is sufficient to maintain an intimate electromechanical contact between the module contacts 52, 54 and the compartment terminals 28, 30.

To remove the power module from its locked position to its initial unlocked position, it is merely necessary to reverse the above procedure. The wheel 70 is turned in the opposite circumferential direction, i.e. opposite to the direction indicated by the solid arrow indicator 104. This turning movement causes the shaft 74 to simultaneously retract both holders 92, 94 and their locking members 84, 86 inwardly of the module, axially along the turning axis. Once the locking members 84, 86 are spaced from the compartment side walls 34, the power module may be removed from the compartment.

This invention is not intended to be limited to electronic flash units, since it is believed to be self-evident that the arrangement and method of this invention can equally well be employed to supply electrical power from an external power source to virtually any battery-powered electrical device.

It will be understood that each of the elements described above, or two or more together, also may find a useful application in other types of constructions differing from the types described above.

While the invention has been illustrated and described as embodied in a lockable power module and method, particularly for electronic flash units, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An arrangement for supplying electrical power from an external electrical power source to a battery-powered electrical device having walls bounding a battery compartment from which the batteries have been removed, and electrical power terminals located within the compartment, said arrangement comprising:
   (a) a power module having electrical contacts and insertable into the compartment to a position of use in which the contacts engage the terminals;
   (b) conductor means connected between the power source and the module, for conveying electrical power from the source to the device when the module is in the use position; and
   (c) locking means on the module, and operative for lockingly engaging the compartment walls to lock the module within the compartment.

2. The arrangement according to claim 1, wherein the locking means includes at least one displaceable locking member, and means for displacing the locking member between a retracted position in which the module is unlocked relative to the compartment, and an extended position in which the module is locked relative to the compartment.

3. The arrangement according to claim 2, wherein the locking means includes another displaceable locking member, said locking members being located at opposite sides of the module, and wherein the displacing means displaces the locking members toward each other inwardly of the module during displacement to the retracted position, and displaces the locking members away from each other outwardly of the module during displacement to the extended position.

4. The arrangement according to claim 3, wherein the locking means includes a manually-operated actuator, and transmission means operatively connected between the actuator and the locking members.

5. The arrangement according to claim 4, wherein the actuator is a wheel mounted on the module for turning movement about a turning axis; and wherein the transmission means includes a shaft having threaded ends of opposite pitch, said shaft being coupled to, and turnable by, the wheel about the turning axis; and further comprising a pair of holders, one for holding each locking member; and wherein each threaded end of the shaft threadedly engages a respective holder; and wherein each holder is mounted on the module for axial movement along the axis.

6. The arrangement according to claim 5, wherein each locking member has outer gripping edges for grippingly engaging opposite walls in the compartment.

7. The arrangement according to claim 1, wherein the module has a leading wall and a trailing wall, as considered along the direction of insertion into the compartment; and wherein the contacts are stationarily mounted on the leading wall, and wherein the trailing wall has an opening through which the conductor means passes.

8. An arrangement for supplying electrical power from an external electrical power source to a battery-powered electrical device having walls bounding a battery compartment from which the batteries have been removed, and electrical power terminals located on a bottom wall within the compartment, said arrangement comprising:

(a) a power module including a housing having a base wall, electrical contacts stationarily mounted on the base wall, and an open top opposite the base wall, said module also including a cover mounted on and covering the open top, said cover having an opening, said covered housing being insertable into the compartment to a position of use in which the base wall overlies the bottom wall and in which the contacts engage the terminals;

(b) conductor means connected between the power source and the module, and including an electrical cable extending through the opening in the cover, for conveying electrical power from the source to the device when the module is in the use position; and (c) manually-operated locking means supported by the cover, and operative for lockingly engaging the compartment walls to lock the module within the compartment, said locking means including a pair of displaceable locking members located at opposite sides of the housing, and actuator means for displacing the locking members toward each other inwardly of the housing to a retracted position in which the module is unlocked relative to the compartment, and for selectively displacing the locking members away from each other outwardly of the housing to an extended position in which the locking members tightly grip the compartment walls and lock the module within the compartment.

9. The arrangement according to claim 8, wherein the actuator means includes a wheel mounted on the cover for turning movement about an axis, said wheel being operatively connected to the locking members and being turnable in one circumferential direction about the axis to displace the locking members to the retracted position, and being turnable in the opposite circumferential direction about the axis to displace the locking members to the extended position.

10. The arrangement according to claim 9; and further comprising indicia means on the cover for visually indicating to a user the direction of turning the wheel to effect displacement of the locking members to the extended position.

11. The arrangement according to claim 9, wherein the electrical device is an electronic flash unit, and wherein the power source is a rechargeable battery pack.

12. A method of supplying electrical power from an external electrical power source to a battery-powered electrical device having walls bounding a battery compartment in which electrical power terminals are located, said method comprising the steps of:

(a) removing batteries from the compartment;
(b) inserting a power module into the compartment to a position of use in which electrical contacts on the module engage the terminals;
(c) connecting a conductor between the power source and the module to convey electrical power from the source to the device when the module is in the use position; and
(d) lockingly engaging the compartment walls to lock the module within the compartment.

13. The method according to claim 12, wherein the lockingly engaging step is performed by manually displacing a pair of locking members on the module outwardly therefrom to grip tightly the compartment walls.

* * * * *